United States Patent
Takagi et al.

(10) Patent No.: US 8,062,557 B2
(45) Date of Patent: Nov. 22, 2011

(54) THERMOPLASTIC RESIN COMPOSITION FOR PRODUCING AUTOMOBILE EXTERIOR PARTS

(75) Inventors: Kiyoji Takagi, Hiratsuka (JP); Morio Tsunoda, Hiratsuka (JP); Masami Suzuki, Hiratsuka (JP); Takayuki Nagai, Toyota (JP); Yasumitsu Isobe, Toyota (JP)

(73) Assignee: DSM IP Assets B.V., Heerlen (NL)

( * ) Notice: Subject to any disclaimer, the term of this patent is extended or adjusted under 35 U.S.C. 154(b) by 247 days.

(21) Appl. No.: 12/299,910

(22) PCT Filed: May 8, 2007

(86) PCT No.: PCT/JP2007/000488
§ 371 (c)(1),
(2), (4) Date: Mar. 10, 2009

(87) PCT Pub. No.: WO2007/132554
PCT Pub. Date: Nov. 22, 2007

(65) Prior Publication Data
US 2009/0309073 A1    Dec. 17, 2009

(30) Foreign Application Priority Data
May 12, 2006  (JP) .................................. 2006-134003

(51) Int. Cl.
*H01B 1/22* (2006.01)
(52) U.S. Cl. ........................................ 252/511; 524/495
(58) Field of Classification Search .................. 252/511; 524/495–496
See application file for complete search history.

(56) References Cited

U.S. PATENT DOCUMENTS

| 7,008,991 B2 * | 3/2006 | Takagi et al. | .................. 524/496 |
| 2006/0124906 A1 * | 6/2006 | Bradley et al. | ................. 252/500 |
| 2007/0117901 A1 * | 5/2007 | Suzuki et al. | .................. 524/442 |

FOREIGN PATENT DOCUMENTS

| JP | 58-108239 | 6/1983 |
| JP | 2004-331766 | 11/2004 |
| JP | 2004-346240 | 12/2004 |
| JP | 2005-179547 | 7/2005 |
| JP | 2006-22131 | 1/2006 |

OTHER PUBLICATIONS

International Search Report for PCT/JP2007/000488 mailed Jul. 17, 2007.

* cited by examiner

*Primary Examiner* — Mark Kopec
(74) *Attorney, Agent, or Firm* — Nixon & Vanderhye P.C.

(57) ABSTRACT

Thermoplastic resin composition containing 18-80 weight % of a polyamide 6 resin with specific viscosity number and specific ratio of terminal carboxyl groups content to terminal amino groups content (component (A)); 5-25 weight % of a hydrogenated product of a block copolymer having a vinyl aromatic compound polymer block and a conjugated diene compound polymer block (component (B)); 3-15 weight % of a graft-modified hydrogenated product of such block copolymer (component (C)), said hydrogenated product being graft-modified with maleic anhydride in an amount of 2.6-5.0 weight % based on 100 weight % of said graft-modified hydrogenated product; 1-5 weight % conductive carbon black with specific BET specific surface area and specific DBP oil absorption (component (D)); 10-30 weight % talc having a specific average particle diameter (component (E)); 0.1-2 weight % of a phosphonite compound (component (F)); 0.5-5 weight % of an ethylene-vinyl alcohol resin (component (G)); 0-1 weight % of a pentaerythritol based phosphite (component (H)).

9 Claims, No Drawings

THERMOPLASTIC RESIN COMPOSITION FOR PRODUCING AUTOMOBILE EXTERIOR PARTS

This application is the U.S. national phase of International Application No. PCT/JP2007/000488 filed 8 May 2007 which designated the U.S. and claims priority to Japanese Patent Application No. 2006-134003 filed 12 May 2006, the entire contents of each of which are hereby incorporated by reference.

TECHNICAL FIELD

The present invention relates to a thermoplastic resin composition for producing automobile exterior parts. More specifically, the present invention is directed to a resin composition having highly balanced properties of fluidity, impact resistance, dimensional stability, rigidity, heat-resistant rigidity, electrical conductivity, coating adhesion and appearance, which properties are required for producing automobile exterior parts to be applied with electrostatic coating, and being excellent in retention stability, and an automobile exterior part prepared by applying an electrostatic coating over a molded article of the resin composition.

BACKGROUND ART

Hitherto, a method has been proposed to mix an electrically insulating thermoplastic resin with an electrically conductive substance for the purpose of forming a resin composition capable of being applied with an electrostatic coating, and such a method is partly practiced. As the electrically conductive substance generally added to the thermoplastic resin, there may be mentioned organic compounds such as ionic surfactants, nonionic surfactants and polymeric antistatic agents having a polyethylene glycol unit and an ionic functional group, as well as inorganic substances such as carbon black, carbon fibers, metal fibers, metal powder and metal oxides. In particular, resin compositions comprising conductive carbon black are most actively investigated in consideration of the balance of cost and physical properties.

Since addition of electrically conductive carbon black into a resin considerably reduces the fluidity and impact resistance of thereof, however, it is a common practice to use carbon black together with an additive such as an impact modifier. The use of an impact modifier, however, causes a reduction of rigidity and heat-resistant rigidity. Thus, there are occasionally cases where such a resin composition cannot be used as a material for producing automobile exterior parts.

When a reinforcing material such as an inorganic filler is additionally compounded in the resin composition in an attempt to improve rigidity and dimensional property thereof, the impact resistance is deteriorated by the addition of the inorganic filler. Moreover, any of the inorganic filler, impact modifier and electrically conductive carbon black mostly serves to reduce the fluidity of the resin. Therefore, it is a great problem how to balance these properties.

When thermoplastic resin materials are utilized for automobile exterior parts such as back doors, bumper fascias, fenders and door panels, a far higher level of performance is recently demanded of them as compared with those for conventional component parts. In this circumstance, materials conventionally used for automobile exterior parts cannot be used.

That is, a material for automobile exterior parts is required to exhibit the following characteristics at a higher level.
(1) Excellent fluidity: It is necessary for the resin material to have excellent fluidity in order to produce a large sized molded articles.
(2) Excellent impact strength: It is necessary for the resin material to have excellent high-speed surface impact strength in order to absorb impact energy by deformation.
(3) Excellent dimensional stability
(3-1) Low heat shrinkage: Automobile exterior parts are applied with a coating at a very high temperature. In high temperature conditions, crystallization of a crystalline resin proceeds to cause shrinkage. As a result, the dimension of the molded article changes before and after the coating. Thus, the article fixed at room temperature before coating considerably deforms after coating. In order to prevent the deformation, a measure is taken not to completely restrict the article but to use a slide jig to absorb the dimensional change. When the dimensional change is great, however, it is not possible to prevent the deformation. It is, therefore, necessary for the resin material to have low heat shrinkage.
(3-2) Low linear expansion: A resin expands when exposed to a high temperatures at a time of coating. In this case, when a coefficient of linear thermal expansion is large, the resin is likely to deform by interference with its adjacent parts.
It is generally necessary to assume that automobiles are used under environment including a temperature in the range of about −20° C. to 80° C. Thus, it is necessary for the resin material to have as small a dimensional change (coefficient of linear expansion) as possible within the above temperature range.
(4) Excellent rigidity: It is necessary for the resin material to have appropriate rigidity at ambient temperature in order to be used as automobile exterior parts.
(5) Excellent heat-resistant rigidity: It is necessary for the resin material to have a high level of heat-resistant rigidity in order to avoid deformation even when exposed to high temperatures at a time of coating.
(6) Excellent conductivity: It is necessary for the resin material to have excellent electrical conductivity in order to be able to be coated by so called "electrostatic coating" technique in which a plate-like body (panel) of the electrically conductive resin material is electrically charged and is sprayed with a paint charged with opposite polarity. By utilization of mutually attracting action between the resin panel surface and the paint which are charged with opposing polarities, the adhesion efficiency of the paint can be improved.
(7) Excellent coating adhesion: It is necessary for the resin material to provide sufficiently high adhesion to a paint so that the coated film is prevented from being peeled off.
(8) Excellent appearance: Appearance needs to be good both before and after coating.
(9) Excellent retention stability: Retention stability at a time of injection molding needs to be excellent.

With regard to resin compositions for producing automobile exterior parts, a polymer alloy of polyphenylene ether and polyamide has been most actively investigated. A great number of resin compositions and method of producing thereof have been thus far been proposed.

For example, proposals are made of a resin composition comprising polyphenylene ether (A), a polyamide (B) and a hydrogenated block copolymer elastomer (C) wherein a dispersion phase of (A) in the composition has a diameter of 0.6 µm or less; and a method of producing the impact resistant polyamide composition, characterized in that modified polyphenylene ether (a) obtained by reacting (A) with a 1,2-substituted olefin compound having a carboxylic acid group, a carboxylic anhydride group or an epoxy group in the presence of a radical generator, a modified hydrogenated block copolymer elastomer (c), obtained by reacting (C) with a 1,2-substituted olefin compound having a carboxylic acid group or a carboxylic anhydride group, and polyamide (B) are melted and kneaded together (Patent Document 1).

Also, there are proposals of an electrically conducting resin composition comprising polyphenylene ether, a polyamide and carbon black, wherein the composition is prepared by previously uniformly dispersing the carbon black in the polyamide, the resulting mixture being then mixed with the polyphenylene ether (Patent Document 2) and a resin composition prepared by first melting and kneading polyphenylene ether, an unsaturated polymer as an impact modifier, a functionalizing compound and optionally a part of a polyamide resin, the resulting mixture being then melted and kneaded with the remainder of the polyamide resin and electrically conductive carbon black having a low content of volatile matters (Patent Document 3).

A polyamide resin composition is further proposed which comprises a resin blend comprising a polyamide (A) having a specific ratio of a content of terminal amino groups to a content of terminal carboxyl groups, a hydrogenated block copolymer (B) obtained by partially or completely hydrogenating a copolymer of a vinyl aromatic compound and a conjugated diene compound, and a modified block copolymer (C) obtained by modifying the copolymer (B) with molecule units having a carboxyl group or group derived therefrom, the conjugated diene compound in the resin blend having an unsaturation degree of not exceeding 20%, components (A), (B) and (C) being contained in a specific ratio, and the polyamide resin composition further contains (D) an ethylene-α-olefin copolymer and (E) an olefin-based polymer having an acid anhydride group at its terminal end only (Patent Document 4).

The above conventional techniques, however, fail to achieve, simultaneously and in a well-balanced manner, the above-mentioned properties required as a material for automobile exterior parts.

Patent Document 1: Japanese Patent No. 2,557,637
Patent Document 2: Japanese Patent No. 2,756,548
Patent Document 3: Japanese Patent Application Laid-open (KOKAI) No. H10-310695
Patent Document 4: Japanese Patent No. 3,330,398

Patent Document 5 proposes a composition comprising a PA/PPE/SEBS alloy and various components compounded therein. Whilst the proposed composition succeeds to improve a balance of properties as compared with the hitherto proposed materials, the fluidity thereof is still in a low level because the composition contains PPE resin having poor melt fluidity. Therefore, there is a limit to the size of molded articles which can be produced.

Patent Document 5: Japanese Patent Application Laid-open (KOKAI) No. 2005-179546

Patent Document 6 proposes a resin composition comprising PA, an impact modifier and specific talc. The Document 6, however, does not specifically disclose methods or examples to improve coating adhesion and electrical conductivity which properties are required as a resin composition for producing automobile exterior parts. Since an improvement of electrical conductivity, namely an addition of carbon black, a carbon fiber or the like causes a deterioration of fluidity appearance and surface impact property, the electrical conductivity is one of the important points to attain balanced physical properties. Further, it is difficult per se to improve the coating adhesion. To improve the coating adhesion while satisfying the other properties in a balanced manner is a significantly difficult technical measure.

Because the Document 6 does not specifically disclose a method to improve the electrical conductivity, the disclosed composition cannot be used as a thermoplastic resin composition for producing automobile exterior parts.

Patent Document 6: Japanese Patent Application Laid-open (KOKAI) No. 2002-220531

As compositions similar to the resin composition of the present invention, the present inventors disclose, in Patent Document 7, a thermoplastic resin composition comprising PA, a vinyl aromatic block copolymer, a modified, hydrogenated block copolymer and an inorganic filler, and, in Patent Document 8, a thermoplastic resin composition comprising PA, an olefin-based polymer graft-modified with an unsaturated dicarboxylic acid, talc and pentaerythritol-based phosphite.

These compositions have highly balanced properties such as fluidity, impact resistance, rigidity, dimensional stability and appearance and can improve the electrical conductivity at the same time.

However, in Patent Document 7, a polyamide resin having a high molecular weight is used to compensate an insufficient improvement of the impact resistance attributed to a low degree of modification of the modified, hydrogenated block copolymer. Thus, it has been found that the balance between the fluidity and impact resistance is still unsatisfactory.

Additionally, it has been found that the combination disclosed in Patent Document 7 is insufficient to achieve the desired balance between fluidity, impact resistance, rigidity and dimensional stability.

In the case of Patent Document 8, the use of the phosphite compound can improve a balance between the impact resistance, rigidity and dimensional stability. However, because the entire amount of the olefin-based polymer, being an impact resistance improving component, is grafted with an unsaturated dicarboxylic acid, the fluidity is low. Thus, the balance of the properties of the proposed composition has been found to be still unsatisfactory.

Furthermore, in the case of the compositions of Patent Documents 7 and 8, when a melted resin is retained for a long period of time in a heated cylinder at the time of injection molding, appearance defects such as "silver streaks" and disadvantages such as deterioration of impact strength and rigidity have been found to be brought about.

Namely, with the prior art thermoplastic resin compositions, the balance of physical properties is insufficient for use as materials for producing automobile exterior parts. The application range of the prior art thermoplastic resin compositions is extremely limited under the present circumstances.

Patent Document 7: Japanese Patent Application Laid-open (KOKAI) No. 2004-331766
Patent Document 8: Japanese Patent Application Laid-open (KOKAI) No. 2004-346240

DISCLOSURE OF THE INVENTION

Problems to be Solved by the Invention

In this circumstance, the present invention is based on the finding of a suitable material for producing automobile exterior parts which has highly balanced physical properties of (1) fluidity, (2) impact resistance, (3) dimensional stability, (4) rigidity, (5) heat-resistant rigidity, (6) electrical conductivity, (7) coating adhesion and (8) appearance and is excellent in (9) retention stability.

Accordingly, it is an object of the present invention to provide a resin composition for producing automobile exterior parts having excellent qualities.

Means for Solving the Problems

In solving the above problem, the present invention provides a thermoplastic resin composition for producing automobile exterior parts, comprising the following components (A) to (H) in the specific ranges based on 100% by weight of the sum of the entire components constituting said composition.

That is, the gist of the present invention resides in a thermoplastic resin composition for producing automobile exterior parts, comprising the following components (A) to (H) in the following weight percentage ranges based on 100% by weight of the sum of the entire components constituting said composition:

18 to 80% by weight of component (A) which is a polyamide 6 resin having a viscosity number, as measured in accordance with ISO-307, of 80 to 120 ml/g and a ratio of a content of terminal carboxyl groups (unit: µeq/g) to a content of terminal amino groups (unit: µeq/g) of 2≦(terminal carboxyl group content/terminal amino group content)≦6;

5 to 25% by weight of component (B) which is a hydrogenated product of a block copolymer comprising a vinyl aromatic compound polymer block and a conjugated diene compound polymer block;

3 to 15% by weight of component (C) which is a graft-modified hydrogenated product of a block copolymer comprising a vinyl aromatic compound polymer block and a conjugated diene compound polymer block, said hydrogenated product being graft-modified with maleic anhydride in an amount of 2.6 to 5.0% by weight based on 100% by weight of said graft-modified hydrogenated product;

1 to 5% by weight of component (D) which is conductive carbon black having a BET specific surface area of not less than 600 m$^2$/g and a DBP oil absorption of not less than 300 ml/100 g;

10 to 30% by weight of component (E) which is talc having an average particle diameter of 0.5 to 10 µm;

0.1 to 2% by weight component (F) which is a phosphonite compound;

0.5 to 5% by weight of component (G) which is an ethylene-vinyl alcohol resin; and 0 to 1% by weight of component (H) which is a pentaerythritol based phosphite.

Effect of the Invention

The present invention achieves the following remarkably advantageous effects and has a great industrial application value.

1. The resin composition for producing automobile exterior parts according to the present invention has excellent, highly balanced fluidity, impact resistance, dimensional stability, rigidity, heat-resistant rigidity, coating adhesion, appearance and retention stability.

2. Molded articles obtained from the resin composition of the present invention may be subjected, similarly to steel plates, to electrostatic coating to give automobile exterior parts.

BEST MODE FOR CARRYING OUT THE INVENTION

The present invention will be described in detail below.
Component (A): Polyamide 6 Resin A polyamide 6 resin which is component (A) used in the present invention has a viscosity number (hereinafter occasionally referred to as ISO viscosity number), as measured in accordance with ISO-307, namely as measured at a temperature of 23° C. for a polyamide solution with a concentration of 0.5% by weight in 96% sulfuric acid, of in the range of 80 to 120 ml/g, preferably in the range of 80 to 110 ml/g.

An ISO viscosity number of the polyamide 6 resin of component (A) in excess of 120 ml/g and below 80 ml/g is not preferable because, in the former case, the fluidity is reduced and, in the latter case, the impact resistance is reduced.

A balance between the fluidity, impact resistance and rigidity may be further improved when component (A) is constituted of two or more polyamide 6 resins having different ISO viscosity numbers. In particular, a mixture comprising polyamide 6 resins of the following component (A-1) and component (A-2) is preferred:
Component (A-1): a polyamide 6 resin having an ISO viscosity number of less than 100 ml/g; and
Component (A-2): a polyamide 6 resin having an ISO viscosity number of not less than 100 ml/g.

The higher the mixing ratio of an amount of component (A-1) to an amount of component (A-2), the better is the fluidity. The lower the ratio, the better is the impact resistance. Thus, the ratio (weight ratio) may be adjusted as necessary in the range of 1/99 to 99/1.

The two or more polyamide 6 resins of component (A) having different ISO viscosity numbers may each have an ISO viscosity number outside or within the above-specified range. However, it is necessary that the mixture (component (A)) of polyamide 6 resins should have an ISO viscosity number within the above-specified range.

It is also important that the polyamide 6 resin of component (A) should have such a terminal structure that a ratio of a content of terminal carboxyl groups (unit: µeq/g) to a content of terminal amino groups (unit: µeq/g) (this ratio will hereinafter occasionally referred to as terminal group ratio) is in the range of 2 to 6, particularly preferably in the range of 2 to 4.

When the terminal group ratio is greater than the above range, the impact resistance is reduced. When the ratio is lower than the above range, the fluidity is reduced. In either case, therefore, the properties cannot be balanced in a high degree.

When plural kinds of polyamide 6 resins having different terminal group ratios are used as the polyamide 6 resin of component (A), they may each have a terminal group ratio outside or within the above-specified range. However, it is necessary that the mixture (component (A)) of polyamide 6 resins should have a terminal group ratio within the above-specified range.

The content of terminal groups may be adjusted by any conventional method. For example, during the polymerization stage, terminal amino groups may be reacted with acetic acid, stearic acid or the like, or terminal carboxyl groups may be reacted with stearylamine or the like, to end-cap the terminal groups. The content of the terminal groups (unit: µeq/g) may be measured by any conventional method. For example, the content of the terminal amino groups may be measured by titration of a phenol solution of the polyamide with 0.05N hydrochloric acid, while the content of the terminal carboxyl groups may be measured by titration of a benzyl alcohol solution of the polyamide with 0.1N sodium hydroxide.

Component (B) and Component (C): Hydrogenated Product of a Block Copolymer Comprising a Vinyl Aromatic Compound Polymer Block and a Conjugated Diene Compound Polymer Block:

The "hydrogenated product of a block copolymer comprising a vinyl aromatic compound polymer block and a conjugated diene compound polymer block" of component (B) and component (C) used for the thermoplastic resin composition of the present invention is a block copolymer, in which the number of aliphatic unsaturated bonds of mainly the conjugated diene compound polymer block has been reduced as a result of the hydrogenation.

In the basic skeletons of the vinyl aromatic compound polymer block and conjugated diene compound polymer block constituting the block copolymer hydrogenated products of component (B) and component (C), the kind of the monomer thereof and/or the composition thereof may be identical to or different from each other. However, component (B) differs from component (C) in that the hydrogenated product of a block copolymer of component (B) is not graft-modified with maleic anhydride.

The arrangement of the vinyl aromatic compound polymer block and conjugated diene compound polymer block may be in a linear structure or a branched structure (radial tereblock). These structures may partially contain a random chain derived from a random copolymer moiety of a vinyl aromatic compound and a conjugated diene-based compound. Among these structures, a linear structure is preferred. From the viewpoint of the balance of the impact resistance and heat resistant rigidity, a block copolymer comprised of a A-B-A type triblock structure is particularly preferred. In this case, the block copolymer may additionally contain a A-B type diblock structure.

The vinyl aromatic compound constituting the hydrogenated product of a block copolymer comprising a vinyl aromatic compound polymer block and a conjugated diene compound polymer block may be, for example, styrene, α-methylstyrene, paramethylstyrene, vinyltoluene and vinylxylene. Above all, styrene is particularly preferred. The conjugated diene-based compound is preferably 1,3-butadiene and 2-methyl-1,3-butadiene.

Examples of the hydrogenated product of a block copolymer usable as component (B) include styrene-ethylene-butene-styrene block copolymer (SEBS) and styrene-ethylene-propylene-styrene block copolymer (SEPS). Examples of component (C) include graft-modified products of these block copolymers. For reasons of excellent heat stability, styrene-ethylene-butene-styrene block copolymer and a graft-modified product thereof are preferred as component (B) and component (C), respectively.

The proportion of the repeating units derived from the vinyl aromatic compound in the component (and component (C) is generally 10 to 70% by weight, particularly preferably 15 to 25% by weight, based on 100% by weight of component (B) and component (C), respectively. A proportion of the repeating units derived from the vinyl aromatic compound below 10% by weight causes a reduction of heat-resistant rigidity and coating adhesion. In excess of 70% by weight, the impact resistance is reduced.

The content of the unsaturated bonds which are derived from the conjugated diene-based compound and which remain unhydrogenated is preferably 20% by weight or less, more preferably 10% by weight of less, of the aliphatic chain moiety of the hydrogenated product of a block copolymer. The aromatic unsaturated bonds derived from the vinyl aromatic compound may be hydrogenated in an amount of about 25% by weight or less.

The hydrogenated product of a block copolymer of component (B) and component (C) used in the thermoplastic resin composition of the present invention preferably as MFR, as measured at 230° C. and a load of 2.16 kg in accordance with ASTM-D1238 standard, of in the range of 0.1 to 200 g/10 min. When MFR is less than the above range, the fluidity is insufficient. When MFR exceeds the above range, the impact resistance is insufficient. The hydrogenated product having MFR in the range of 1 to 30 g/10 min is particularly preferably used.

The maleic anhydride graft-modified hydrogenated product of a block copolymer comprising a vinyl aromatic compound polymer block and a conjugated diene compound polymer block used as component (C) in the present invention may be produced by a known method used for the graft-modification with maleic anhydride.

For example, a method in which a hydrogenated product of a block copolymer, maleic anhydride and a free radical generator are mixed and reacted in a melted state to graft-modifying the block copolymer.

As the free radical generator, there may be mentioned, for example, an organic peroxide and an azo compound.

Specific examples of the organic peroxide include (a) hydroperoxides such as t-butyl hydroperoxide, cumene hydroperoxide, 2,5-dimethylhexane-2,5-dihydroperoxide, 1,1,3,3-tetramethylbutyl hydroperoxide, p-menthane hydroperoxide and diisopropylbenzene hydroperoxide; (b) dialkylperoxides such as 2,5-dimethyl-2,5-di(t-butylperoxy)hexyne-3, di-t-butylperoxide, t-butylcumylperoxide, 2,5-dimethyl-2,5-di-t-butylperoxy)hexane, dicumylperoxide and 1,3-bis-(t-butylperoxyisopropyl)benzene; (c) peroxyketals such as 2,2-bis(t-butylperoxy)butane, 2,2-bis(t-butylperoxy)octane, 1,1-bis(t-butylperoxy)cyclohexane and 1,1-bis(t-butylperoxy)-3,5,5-trimethylhexane; (d) peroxyesters such as di-t-butyl peroxyisophthalate, t-butyl peroxybenzoate, t-butyl peroxyacetate, 2,5-dimethyl-2,5-di benzoylperoxy)hexane, t-butyl peroxyisopropylcarbonate and t-butyl peroxyisobutylate; and (e) diacylperoxides such as benzoylperoxide, m-toluoylperoxide and acetylperoxide.

Examples of the azo compound include 2,2'-azobisisobutylonitrile, 2,2'-azobis(2-methylbutylonitrile), 1,1'-azobis(cyclohexane-1-carbonitrile), 1-[(1-cyano-1-methylethyl)azo]formamide, 2-phenylazo-4-methoxy-2,4-dimethylvalelonitrile, 2,2'-azobis(2,4,4-trimethylpentane) and 2,2'-azobis(2-methylpropane).

Among these free radical generators, those having a half life temperature at 10 hours of at least 120° C., such as 1,3-bis-(t-butylperoxyisopropyl)benzene, are preferred.

A concrete method for producing component (C) by reacting a hydrogenated product of a block copolymer in a melted state may be a method in which the hydrogenated product is mixed with maleic anhydride and a free radical generator in a melted state and reacting the mixture. Such mixing and reaction in a melted state may be carried out using a melt kneader generally practically employed for thermoplastic resins. The modification reaction proceeds during melting the mixture using the melt kneader.

Examples of melt kneader include single or multi-screw extruders, heating rolls and Banbury mixers. When the method using an extruder is adopted, it is preferred that a hydrogenated product of a block copolymer, maleic anhydride and a free radical generator be previously mixed using a blender, etc. and the resulting mixture be fed at one time from an upstream portion of the extruder for reacting the mixture therein.

A graft ratio of maleic anhydride in component (C) is such that the amount of maleic anhydride bonded thereto is in the range of 2.6 to 5.0% by weight based on 100% by weight of the graft-modified, hydrogenated product of a block copolymer comprising a vinyl aromatic compound polymer block and a conjugated diene compound polymer block (component (C)). When the graft ratio is greater than or less than the above range, the balance of physical properties such as fluidity, impact resistance and rigidity is lost and such a graft product is ill-suited.

The graft ratio of maleic anhydride in component (C) used in the present invention may be measured by the following method.

1. Pretreatment of Sample:
In order to remove unreacted maleic anhydride, a sample is purified by reprecipitation.
(1-1) The sample (about 6 g) was dissolved in 60 mL of toluene, to which is then added 300 mL of acetone to reprecipitate the polymer. The precipitate is separated by centrifuge (6,500 rpm, 5 minutes).
(1-2) The separated precipitate is added with 300 mL of acetone and the mixture is stirred for 4 hours with a stirrer. The mixture is then allowed to quiescently stand.
(1-3) The supernatant is removed by decantation and the precipitate is recovered by centrifuge (6,500 rpm, 10 minutes).
(1-4) The recovered precipitate is dried at 60° C. for 5 hours in a vacuum drier to obtain a purified polymer.

2. Neutralization Titration:
(2-1) Purified sample (about 2.5 g) is precisely weighed and placed in a capped Erlenmeyer flask.
(2-2) The sample is added with and dissolved in 90 mL of toluene which has been bubbled with nitrogen for 30 minutes.
(2-3) After dissolution, 10 mL of ethanol is added. Further an indicator amount of a phenolphthalein solution is added. The solution is then titrated with an ethanolic potassium hydroxide solution (potassium hydroxide concentration of 0.1 ml/L). The phenolphthalein solution used as the indicator is a solution of 85% by volume ethanol (phenolphthalein concentration: 10 g/L).
(2-4) The "90 mL of toluene which has been bubbled with nitrogen for 30 minutes" used in (2-2) is subjected to measurement of (2-3) to obtain a blank value.

3. Calculation Method:
A graft ratio (mmol/g) of maleic anhydride is calculated using the following formula:

$$J = K \times F \times (M-N)/W$$

J: graft ratio (mmol/g) of maleic anhydride
K: concentration of titration solution (mol/L)
F: factor
M: titer (mL)
N: blank titer (mL)
W: sample weight (g)

Conversion to graft ratio (% by weight) of maleic anhydride is made using the following formula:

$$P = (J \times Q/1,000) \times 100$$

P: graft ratio (% by weight) of maleic anhydride
Q: 98 (molecular weight of maleic anhydride: g/mol)
1,000: conversion factor from mmol to mol
100: conversion factor from g/g to % by weight Component (D): Conductive Carbon Black Examples of conductive carbon black used as component (D) may include furnace black, furnace black, acetylene black, channel black and ketchen black. Among them, ketchen black is preferred because even a small compounding amount thereof can achieve electrical conductivity.

When carbon black used neither has a BET specific surface area of not less than 600 $m^2/g$ nor a DBP oil absorption of not less than 300 ml/100 g, it becomes difficult to balance the electrical conductivity, impact resistance, fluidity, etc., because such carbon black must be used in a large amount in order to obtain desired electrical conductivity.

Component (E): Talc

Talc used as component (E) in the present invention is plate-like particles of magnesium silicate having a layer structure and is a mineral having a composition comprising 58 to 66% by weight of $SiO_2$, 28 to 35% of MgO, about 5% by weight of $H_2O$ and other small amount components such as $Fe_2O_3$, $Al_2O_3$, CaO, $Na_2O$, $K_2O$, $TiO_2$, $P_2O_5$ and $SO_3$. Depending upon impurities contained, the pH of talc varies from 8 to 11. The specific gravity is about 2.7. It is preferred that component (E) used in the present invention be talc having as small an amount of impurities as possible.

A method of grinding talc ore is not specifically limited. It is, however, preferable to use talc which has been deaerated and compressed or talc obtained by being granulated with a trace amount of a clay substance such as montmorillonite as a binder for increasing the bulk density thereof for reasons of excellent productivity and dispersion efficiency in the production of the resin composition.

The average particle diameter of talc used in the present invention is 0.5 to 10 µm. The average particle diameter as used herein is intended to refer to a number average particle diameter measured on the primary particles by a laser analysis method and is a diameter at which the integrated value reaches 50% of the number of the particles. When the average particle diameter of talc is greater than the above range, the impact resistance and appearance are deteriorated. The sharper is the particle distribution of talc, the more preferred. It is particularly preferable to use talc in which particles with a particle diameter of greater than 10 µm are removed as much as possible for reasons of good surface impact resistance.

Talc may be or may not be subjected to an aminosilane treatment, though such a treatment is preferably not done in order to balance the rigidity and impact resistance.

Component (F): Phosphonite Compound

Specific examples of the phosphonite compound used as component (F) in the present invention include tetrakis(2,4-di-tert-butylphenyl)-4,4'-biphenylene diphosphonite, tetrakis(2,5-di-tert-butylphenyl)-4,4'-biphenylene diphosphonite, tetrakis(2,3,4-trimethylphenyl) 4,4'-biphenylene diphosphonite, tetrakis(2,3-dimethyl-5-ethylphenyl)-4,4'-biphenylene diphosphonite, tetrakis(2,6-di-tert-butyl-5-ethylphenyl)-4,4'-biphenylene diphosphonite, tetrakis(2,3,4-tributylphenyl)-4,4'-biphenylene diphosphonite and tetrakis(2,4,6-tri-t-butylphenyl)-4,4'-biphenylene diphosphonite. Among phosphonite compounds, 4,4'-biphenylene diphosphonite compounds such as tetrakis(2,4-di-tert-butylphenyl)-4,4'-biphenylene diphosphonite are preferred for reasons of significant effect of improving the retention stability.

Component (G): Ethylene-Vinyl Alcohol Resin

The ethylene-vinyl alcohol resin used as component (G) in the present invention is intended to refer to a copolymer of ethylene and vinyl alcohol. The ethylene-vinyl alcohol resin is generally produced by saponification of a copolymer of ethylene and a vinyl ester. The ethylene-vinyl alcohol resin generally has a saponification degree of 70 mole % or more. A saponification degree of less than 70 mole % is not desirable because the thermal stability is reduced. The ethylene-vinyl alcohol resin preferably has an ethylene copolymerization ratio of 40 to 50 mole % because the highest coating adhesion is obtainable within this range. For reason of fluidity, it is also preferred that the ethylene-vinyl alcohol resin have MI as measured in accordance with JIS-K6730 (temperature: 190° C., load: 2.16 kg) of 0.5 g/10 min or more. A form of the ethylene-vinyl alcohol resin is not specifically limited but is suitably a pellet-like form for reasons of uniform dispersibility.

The most suitable method for compounding component (G) is such that pellets of component (G) are dry-blended with pellets of a resin composition, obtained by fusing and kneading all of the components except component (G). When component (G) is not dry-blended but is melted and kneaded with the other components, it becomes difficult to highly balance the physical properties due to a reduction of the effect of improving the coating adhesion and a reduction of the heat-resistant rigidity.

Other Components

In the thermoplastic resin composition for producing automobile exterior parts according to the present invention, various kinds and amounts of additives for resin other than the above components may be compounded (incorporated) as long as the effects of the present invention are not adversely affected. Examples of the additives for resin include a thermal stabilizer, an antioxidant, a weatherability improver, a UV absorber, a nucleating agent, a blowing agent, a flame retardant, an impact modifier, a lubricant, a plasticizer, a fluidity improver, a dye, a pigment, an organic filler, a reinforcing agent and a dispersing agent.

As one of the "other components", it is preferable to use a dimensional stability improving aid, especially a pentaerythritol based phosphite, being component (H), since a balance between the impact resistance, dimensional stability and rigidity of the resin composition of the present invention is enhanced.

Component (H): Pentaerythritol Based Phosphite

Specific examples of the pentaerythritol based phosphite used as component (H) include bis(2,4-di-t-butylphenyl)pentaerythritol diphosphite, tetraphenyltetra(tridecyl)pentaerythritol tetraphosphite, a hydrogenated bisphenol A pentaerythritol phosphate polymer, dinonylphenylpentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl)pentaerythritol diphosphite, bis(2,6-di-t-butyl-4-octylphenyl)pentaerythritol diphosphite, bis(2,4-dicumylphenyl)pentaerythritol diphosphite and distearyl pentaerythritol diphosphite. Above all, bis(2,6-di-t-butyl-4-methylphenyl)pentaerythritol diphosphite is preferred. The above-exemplified phosphate compounds may be used singly or as a mixture of two or more thereof.

When component (H) is compounded in the composition of the present invention, the content there of is preferably 0.1 to 1% by weight based on 100% by weight of the sum of the entire components constituting the composition. A content of component (H) below this range cannot give an effect of further improving the rigidity and dimensional stability. Too large an amount is not desirable because the retention stability is reduced.

Contents of the Components

The contents of components (A) to (H) in the thermoplastic resin composition for producing automobile exterior parts according to the present invention should fall with the following ranges based on 100% by weight of the sum of the entire components constituting the composition.

Component (A): 18 to 80% by weight, preferably 20 to 75% by weight,
Component (B): 5 to 25% by weight, preferably 6 to 23% by weight,
Component (C): 3 to 15% by weight, preferably 4 to 14% by weight,
Component (D): 1 to 5% by weight, preferably 1.5 to 4.5% by weight,
Component (E): 10 to 30% by weight, preferably 12 to 28% by weight,
Component (F): 0.1 to 2% by weight, preferably 0.2 to 1.5% by weight,
Component (G): 0.5 to 5% by weight, preferably 1 to 4% by weight,
Component (H): 0 to 1% by weight, preferably 0.1 to 1% by weight.

When even one of the contents of the components is outside the above range, it is not possible to highly balance the physical properties of the impact resistance, rigidity, fluidity, electrical conductivity, retention stability, etc.

More specifically, when the content of component (A) is outside the specified range, the entire physical properties are greatly influenced. In particular, when the content is below the specified range, the fluidity, dimensional stability, rigidity, heat resistant rigidity and appearance are deteriorated. When the content is above the specified range, the impact resistance, dimensional stability, electrical conductivity, etc. are deteriorated.

When the content of component (B) is below the specified range, the impact resistance is reduced. When the content is above the specified range, the fluidity, rigidity, heat resistant rigidity, dimensional stability, appearance, etc. are deteriorated.

When the content of component (C) is below the specified range, the impact resistance is reduced. When the content is above the specified range, the fluidity, rigidity, heat resistant rigidity, dimensional stability, appearance, etc. are deteriorated.

When the content of component (D) is below the specified range, the electrical conductivity is reduced. When the content is above the specified range, the fluidity, impact resistance, appearance, etc. are deteriorated.

When the content of component (E) is below the specified range, the rigidity, dimensional stability, etc. are deteriorated. When the content is above the specified range, the fluidity, impact resistance, appearance, etc. are deteriorated.

When the content of component (F) is below the specified range, the retention stability is unsatisfactory. When the content is above the specified range, the appearance is deteriorated.

When the content of component (G) is below the specified range, the coating adhesion is deteriorated. When the content is above the specified range, the fluidity, heat-resistant rigidity, etc. are deteriorated.

It is preferred that the content ratios of the components satisfy the following equations (1) and (2) since the physical properties can be highly balanced.

$$\text{component } (A)/(\text{component } (B)+\text{component } (C))=65/35 \text{ to } 85/15 \qquad \text{Equation (1):}$$

(wherein component (A), component (B) and component (C) represent weight percentages of these components based on 100% by weight of the sum of component (A), component (B) and component (C))

$$\text{component } (A)/\text{component } (D)=93/7 \text{ to } 97/3 \qquad \text{Equation (2):}$$

(wherein component (A) and component (D) represent weight percentages of these components based on 100% by weight of the sum of component (A) and component (D)).

Dispersing Form of the Components:

In the thermoplastic resin composition for producing automobile exterior parts according to the present invention, it is also preferred that a micro dispersing form of the components thereof have the following dispersing form.

Components (A), (B) and (C):

It is preferred that the polyamide 6 resin of component (A) form a sea phase (matrix phase), while the hydrogenated products of a block copolymer, being components (B) and (C), form, separately or as a mixture, island phases (domain phases) dispersed in the sea phase. In this case, it is also preferred that the island phases have an average dispersing particle diameter in the range of 0.1 to 1 μm. when the average dispersing particle diameter of the island phases is above or below the above range, the rigidity and impact strength are reduced.

Incidentally, a dispersing form in which component (B), component (C) or a mixture of components (B) and (C) forms a sea phase while component (A) forms island phases dispersed therein is not preferable because the rigidity, heat-resistant rigidity and dimensional stability are considerably reduced.

Components (D) and (E):

It is preferred that the conductive carbon black of component (D) be mainly dispersed in the sea phase of component A (polyamide 6 resin) and that the talc of component (E) be also mainly dispersed in the sea phase of component A.

In a preferred dispersing form of the composition of the present invention, the polyamide 6 resin of component (A) forms a sea phase (matrix phase) in which components (D) and (E) are mainly dispersed.

As used herein, the term "mainly" is intended to mean that each of components (D) and (E) is dispersed in the sea phase of component (A) in an amount of more than 50% by weight based on 100% by weight of the corresponding component.

When component (D) is not dispersed in the sea phase of component (A) but is dispersed in the island phases of component (B) and/or component (C), the electrical conductivity is undesirably considerably reduced. When component (E) is dispersed in the phases of component (B) and/or component (C), the rigidity, heat-resistant rigidity, dimensional stability and impact resistance are undesirably reduced.

Melting and Kneading Method

The dispersing form of each of the components may be easily achieved by adequately controlling a melting and kneading method adopted for the preparation of the resin composition of the present invention.

For example, in a case where the melting and kneading procedure is carried out in plural stages, the following method may be adopted. In the first stage, conductive carbon black of component (D) is first melted and kneaded together with at least part of the polyamide 6 resin of component (A) using a twin screw extruder to obtain resin composition pellets (component (AD)) in which component (D) is dispersed in a phase of component (A).

Next, in the second stage, component (AD) is melted and kneaded together with the remaining part of component (A) and components (B) and (C) using a twin screw extruder to obtain resin composition pellets (component (ABCD)) in which components (B), (C) and (D) are micro-dispersed in a phase of component (A).

Subsequently, in the third stage, component (ABCD) and talc of component (E) are melted and kneaded together to obtain the above-described preferred dispersing form.

In this case, the phosphonite compound of component (F) may be added at any timing in the first through third stages. The ethylene-vinyl alcohol resin of component (G) is dry-blended with the pellets of a resin composition obtained by melting and kneading all of the components other than component (G), as described previously.

The above-described preferred dispersing form may be confirmed by observing a micro structure (such as fine texture or morphology) of a small piece sampled from the resin composition pellets or an injection-molded article thereof by a transmission electron microscope (TEM).

More specifically, such observation may be easily made as follows. A small piece is sampled from the resin composition pellets or an injection-molded article thereof by, for example, cutting at a temperature of −100° C. into an ultra-thin section having a thickness of 100 nm using a diamond knife of a microtome (ULTRCUT CUT manufactured by Leica Inc.) equipped with a cryo device. The cut surface of the small piece is stained with osmium tetraoxide and ruthenium tetraoxide and measured by a transmission electron microscope (e.g., Model JEM1200EX II manufactured by JOEL Ltd.).

It is without saying that the resin composition of the present invention may be prepared using various known methods. In order to achieve the desired dispersing form of each of the components, however, it is preferred the above-described melting and kneading method be followed.

The material properties aimed at by the present invention for obtaining excellent articles as the thermoplastic resin composition for producing automobile exterior parts are as follows.

Details of the method for evaluating each of the properties are described in the paragraph under the heading of [Method for evaluating properties of composition] described in the hereinafter described Examples.

(1) Fluidity

Desired value: A bar-flow flow length in a mold with a thickness of 2 mm is 550 mm or more.

(2) Impact Resistance

Desired value: A high speed surface impact strength of a test piece before coating is 30 J or more.

(3) Dimensional Stability (3-1) Reheating Shrinkage

Desired value: A reheating shrinkage at 150° C. for 40 minutes is 0.4% or less.

(3-2) Coefficient of Linear Thermal Expansion

Desired value: A coefficient of linear thermal expansion is $9 \times 10^{-5} K^{-1}$ or less.

(4) Rigidity

Desired value: A flexural modulus is 2,500 MPa or more.

(5) Heat-Resistant Rigidity

Desired value: A thermal deformation temperature is 180° C. or more.

(6) Electrical Conductivity

Desired value: A volume resistivity is $1 \times 10^8$ Ωcm or less.

(7) Coating Adhesion

Desired: A residual rate of the coating in cross-cut adhesion test is 100'.

(8) Appearance (8-1) Before Coating

Desired: A surface of the molded article before coating is free of appearance defects such as silver streaks, significant filler floating and flow marks.

(8-2) After Coating

Desired: An image clarity on a surface of the coated film after coating is good.

(9) Retention Stability

Desired: A surface of the molded article is free of appearance defects such as silver streaks when the article is continuously retained in the cylinder of the molding machine at a resin temperature of 280° C. for 20 minutes or more.

Thus, when the desired properties of the above items (1) to (8) are all met, the composition of the present application may be said to have highly balanced physical properties.

When the desired retention stability of the above item (9) is additionally met, the composition may be said to be excellent in production stability for injection molded articles.

EXAMPLES

The present invention will be described in further detail below by way of examples but is in no way limited to the examples. Details of the properties, etc. of materials used in the following examples and comparative examples are described below. The evaluation of the obtained resin compositions will be described in detail hereinafter under the heading of [Method for evaluating properties of composition].
[Materials Used in the Examples]
Component (A): Polyamide 6 Resin
Component (A-1): Polyamide 6 Resin with ISO Viscosity Number Of Less than 100 ml/g
Component (A-1-1):
  trade name: NOVAMID 1005J manufactured by Mitsubishi Engineering-Plastics Corporation, ISO viscosity number: 86 ml/g, melting point: 223° C., content of terminal amino groups: 26 μeq/g, content of terminal carboxyl groups: 126 μeq/g, terminal carboxyl group content/terminal amino group content ratio: 4.85
Component (A-1-2):
  trade name: NOVAMID 1007JX manufactured by Mitsubishi Engineering-Plastics Corporation, ISO viscosity number: 99 ml/g, melting point: 223° C., content of terminal amino groups: 84 μeq/g, content of terminal carboxyl groups: 88 μeq/g, terminal carboxyl group content/terminal amino group content ratio: 1.05
Component (A-1-3):
  trade name: NOVAMID 1007J manufactured by Mitsubishi Engineering-Plastics Corporation, ISO viscosity number: 99 ml/g, melting point: 223° C., content of terminal amino groups: 26 μeq/g, content of terminal carboxyl groups: 87 μeq/g, terminal carboxyl group content/terminal amino group content ratio: 3.3
Component (A-2): Polyamide 6 Resin with ISO Viscosity Number of 100 ml/g or More
Component (A-2-1):
  trade name: NOVAMID 1010J manufactured by Mitsubishi Engineering-Plastics Corporation, ISO viscosity number: 118 ml/g, melting point: 223° C., content of terminal amino groups: 26 μeq/g, content of terminal carboxyl groups: 77 μeq/g, terminal carboxyl group content/terminal amino group content ratio: 2.96
Component (A-2-2):
  trade name: NOVAMID 1020J manufactured by Mitsubishi Engineering-Plastics Corporation, ISO viscosity number: 182 ml/g, melting point: 223° C., content of terminal amino groups: 40 μeq/g, content of terminal carboxyl groups: 40 μeq/g, terminal carboxyl group content/terminal amino group content ratio: 1
Component (B): Hydrogenated Product of Block Copolymer of Vinyl Aromatic Compound Polymer Block and Conjugated Diene Compound Polymer Block:
Component (B-1):
  substance: styrene-ethylene-butene-styrene copolymer (hereinafter referred to as SEBS for brevity), trade name: TAFTEC H1052 manufactured by Asahi Kasei Corporation, styrene content: 20% by weight, MFR: 8 g/10 min (measured according to ASTM-D1238 at 230° C. and load of 2.16 kg)
Component (C): Maleic Anhydride Graft-Modified Hydrogenated Product of Block Copolymer of Vinyl Aromatic Compound Polymer Block and Conjugated Diene Compound Polymer Block:
Component (C-1):
  substance: maleic anhydride-modified SEBS, trade name: TAFTEC M1943 manufactured by Asahi Kasei Corporation, maleic anhydride graft ratio: 2.7% by weight (measured by the above-mentioned analytic method), styrene content: 20% by weight, MFR: 8 g/10 min (measured according to ASTM-D1238 at 230° C. and load of 2.16 kg)
Component (D): Conductive Carbon Black
Component (D-1):
  trade name: KETCHEN EC600JD manufactured by Lion Corporation, specific surface area: 1,270 m$^2$/g, DBP oil absorption: 495 ml/100 g
Component (E): Talc (Magnesium Silicate)
Component (E-1):
  trade name: Compressed Talc HST 0.5 manufactured by Hayashi Kasei Kogyo Co., Ltd., average particle diameter: 2.75 μm, chemical composition (fluorescent X-ray analysis results, weight ratio): {($SiO_2$=60.7%)/(MgO=30.9%)/($Fe_2O_3$=0.12%)/($Al_2O_3$=0.04%)/(CaO=0.41%)/($Na_2O$=0.02%)/($K_2O$=0%)/($TiO_2$=0.001%)/($P_2O_5$=0.04%)/($SO_3$=0%)/(ignition loss (mostly water)=5.7%)}, pH: 9.3, specific gravity: 2.7, bulk density: 1 g/cm$^3$, particle shape: plate-like, surface treatment with silane coupling agent: none
Component (F): Phosphonite Compound
Component (F-1):
  substance: tetrakis(2,4-di-tert-butylphenyl)-4,4'-biphenylene diphosphonite, trade name: SANDSTAB P-EPQ manufactured by Clariant Japan K. K
Component (G): Ethylene-Vinyl Alcohol Resin
Component (G-1):
  trade name: EVAL G156A manufactured by Kuraray Co., Ltd., ethylene copolymerization ratio: 47 mole %, specific gravity: 1.12, MI: 6 g/10 min (measured according to JIS-K6730 at 190° C. and load of 2.16 kg), saponification degree: 100 mole %, shape of pellets: cylinder of 3 mm diameter and 4 mm height)
Component (H): Pentaerythritol-Based Phosphite Compound
Component (H-1):
  substance: bis(2,6-di-t-butyl-4-methylphenyl)-pentaerythritol diphosphite, trade name: PEP36 manufactured by Adeka Corporation, melting point: 234-240° C., volatility (10% weight loss temperature): 361° C.
Component (I): Other Components
Component (I-1):
  substance: maleic anhydride-graft modified ethylene-butene-1 copolymer, trade name: MODIC-AP730T manufactured by Mitsubishi Chemical Corporation, brittle temperature: less than −70° C., surface hardness: 83 (measured according to JIS-K6301, type-A), density: 0.89 g/ml, MFR: 2 g/10 min (measured according to ASTM-D1238 at 190° C. and load of 2.16 kg)
[Method for Evaluating Properties of Composition]
  Each of the properties was evaluated according to the following procedures.
1. Preparation of Test Pieces
(1) Preparation of Test Pieces in Accordance with ASTM-D790, D638 and D648
  Molding was carried out using a molding machine J75ED (manufactured by Nippon Seikosho Co., Ltd.) at a resin temperature of 280° C. and a mold temperature of 80° C. with an injection pressure holding time of 15 seconds, a cooling time of 15 seconds and a one-cycle time of 40 seconds. The obtained test pieces were used for the evaluation of their rigidity, heat resistant rigidity and electrical conductivity.

(2) Preparation of Sheet-Like Test Pieces of 100×100×3 mm Thick

Molding was carried out using a molding machine SH100 (manufactured by Sumitomo Heavy Industries, Ltd.) at a resin temperature of 280° C. and a mold temperature of 80° C. with an injection pressure holding time of 15 seconds, a cooling time of 15 seconds and a one-cycle time of 40 seconds. The obtained test pieces were used for the evaluation of their impact resistance, reheating shrinkage and appearance.

(3) Preparation of Sheet-Like Test Pieces of 100×100×3 mm Thick by Retention Molding Molding was carried out using a molding machine SH100 (manufactured by Sumitomo Heavy Industries, Ltd.) at a resin temperature of 280° C. and a mold temperature of 80° C. with a waiting time being provided between shots for retaining the resin in the cylinder for a predetermined period of time.

Namely, while an injection molding process is normally carried out in the order of injection→plasticizing and cooling→mold opening→product ejection→mold closing (at this point one molding cycle is completed)→injection, the molding (retention molding) was carried out with a retention step (interval) being provided so that an interval of 20 minutes was allowed after the mold closing before starting the next injection as follows: injection→plasticizing and cooling→mold opening→product ejection→mold closing→interval (at this point one molding cycle is completed)→injection.

The preparation of the test pieces by retention molding was thus carried out with an injection time of 15 seconds, a cooling time of 15 seconds, a mold opening, mold closing and other process time of 10 seconds and an interval of 20 minutes (one-cycle time of 20 minutes and 40 seconds). With such a molding cycle, the molding was continuously carried out 5 shots for stabilizing the molding. Molded articles obtained in the fifth shot were used as test pieces for the evaluation of retention stability.

2. Measurement and Evaluation (1) Fluidity

Fluidity was evaluated by measuring a flow length in a bar-flow mold with a thickness of 2 mm and a width of 10 mm. The greater the flow length, the better is the fluidity. Detailed conditions were as given below.

Molding machine: IS150 of Toshiba

Mold: bar-flow mold (2 mm thick×10 mm wide) possessed by Mitsubishi-Engineering Plastics Corporation Molding temperature: set cylinder temperature of 280° C. and set mold temperature of 80° C.

Injection/cooling time: 10 sec/15 sec

One cycle time: 40 seconds

Injection pressure: 98 MPa

The bar-flow flow length was measured for a molded product in the 15th (last) shot in the continuous 15 shot-molding.

(2) Impact Resistance

A sheet-like test piece with a size of 100 mm×100 mm×3 mm thick was collided with a shaft having round edge and moving at a speed of 1 m/sec in the direction normal to the surface of the test piece. The impact resistance was measured in terms of the collision energy (high speed surface impact strength) required for piercing the test piece in the thickness direction thereof. The higher the surface impact strength, the better is the impact resistance. Detailed conditions were as given below.

Measuring device: Servo pulser manufactured by Shimadzu Corporation

Measuring ambient temperature: 23° C.

Shape of shaft edge: round with R of 12.7 mm

Piercing speed of shaft: 1 m/sec

Moistened state of test piece: absolutely dry state

Diameter of support (fixing clamp) for test pieces 76.2 mm

The high speed surface impact strength used for the evaluation is a mean value of the 5 measured results.

(3) Dimensional Stability (3-1) Reheating Shrinkage

Dimensional stability was evaluated in terms of a reheating shrinkage of a sheet-like test piece with a size of 100 mm×100 mm×3 mm thick caused when heated at 150° C. for 40 minutes. The smaller the reheating shrinkage, the better is the dimensional stability. Detailed conditions were as given below.

(i) Measurement of Dimension Before Heating

The lengths of the peripheral four sides (2 sides parallel with the resin flow direction and 2 sides normal thereto) of a 100 mm×100 mm test piece are measured to obtain four measured values {L1} to {L4}.

(ii) Heat Treatment

The test piece is placed in a hot-wind oven heated at 150° C. and aged (heat-treated) for 40 minutes.

After the 40 minute-treatment, the test piece is taken out of the oven and placed in an aluminum bag. After sealing, the test piece is cooled at 23° C. for 24 hours while preventing absorption of moisture.

(iii) Measurement of Dimension after Heating

The lengths of the corresponding peripheral four sides of the test piece after the heat treatment are measured to obtain four measured values {LG1} to {LG4}.

(iv) Calculation of Shrinkage

A reheating shrinkage of that side giving the length of {L1} and its corresponding length {LG1} is calculated from the following equation:

$$\text{Reheating shrinkage }(\%)=[\{L1\}-\{LG1\}]/\{L1\}\times 100$$

Similar calculation is done to determine the other three sides having the lengths of {L2} to {L4} and their corresponding lengths {LG2} to {LG4}.

The reheating shrinkage of the test piece is a mean value of the above-calculated four shrinkage values for the four sides of the test piece.

(3-2) Coefficient of Linear Thermal Expansion

Dimensional stability was also evaluated in terms of a coefficient of linear thermal expansion in the flow direction of the resin (MD direction). The smaller the coefficient of linear thermal expansion, the better is the dimensional stability. Detailed conditions were as given below.

Test specimen: A test piece for bending according to ASTM was cut into a size of 8 mm×8 mm×6 mm thick. This was annealed at 120° C. for 12 hours with hot wind, then placed in an aluminum bag and cooled to room temperature while preventing absorption of moisture to obtain a test specimen.

Measuring device: EXSTAR6000 manufactured by Seiko-Instruments Inc.

Temperature control: The specimen was allowed to stand at 0° C. for 30 minutes for stabilization and, thereafter, heated to 100° C. at a rate of 2° C./min.

The dimensional stability was evaluated in terms of a coefficient of linear thermal expansion in the MD direction (in the flow direction of the resin) during heating from 23° C. to 83° C.

(4) Rigidity

The rigidity was evaluated in terms of a flexural modulus measured at ambient temperature (23° C.) in accordance with ASTM-D790 for a test piece in the absolutely dry state. The higher the flexural modulus, the better is the rigidity.

(5) Heat-Resistant Rigidity

The heat resistant rigidity was evaluated in terms of a thermal deformation temperature measured in accordance with ASTM-D648 under a stress of 0.45 MPa for a test piece in the absolutely dry state. The higher the bending modulus, the better is the heat resistant rigidity.

(6) Electrical Conductivity

Electrical conductivity was evaluated in terms of a volume resistivity. The smaller the volume resistivity, the better is the electrical conductivity. Detailed conditions were as given below.

Test specimen: A test piece for tensile test according to ASTM-D638 was cut at both ends with a pruning shears to obtain a tape having a size of 12.7 mm×50 mm×3 mm thick A silver paste was applied to each of the end surfaces (12.7 mm×3 mm) and the resulting coating was dried at 23° C. for 30 minutes in the air to obtain the test specimen.

Measurement: Electrical resistance between the both ends of the test specimen was measured with a tester, from which a volume resistivity was calculated.

Tester: MG-1600 manufactured by Custom corporation.

(7) Coating Adhesion

Coating adhesion was evaluated by a cross-cut adhesion test in which the state of the coating remaining on a test piece was observed. Coating adhesion is good when the evaluation result is rated as "++". Detailed conditions were as given below.

Coated test specimen: A sheet-like test piece with a size of 100 mm×100 mm×3 mm thick was applied on its one side (referred to as "coating surface") with an acrylic-urethane-based paint (OP-Z-NY manufactured by Origin Electric Co., Ltd.) and cured at 80° C. for 60 minutes to obtain a coated test specimen having a coating of a thickness of 40 to 60 μm on the coating surface.

Formation of cross cuts: In the coated test specimen, eleven vertical slits and eleven lateral slits are formed with each slit extending in depth to the coating surface from the top of the coating to obtain a cross cut pattern consisting of 100 square sections each having a side length of 1 mm.

Peel test: A 18 mm width adhesive tape (cellophane tape) is affixed on to a surface of the coated test specimen such that the entire of the cross cut pattern is covered with the adhesive tape. Then, the adhesive tape is quickly peeled off to check with naked eyes whether or not the coating completely remained on the coating surface without having been peeled off with the tape.

The evaluation of the coating adhesion was rated as follows:

++: None of the 100 sections of the cross cut pattern were removed.

--: One or more sections were removed.

(8) Appearance (8-1) Before Coating

A sheet-like test piece with a size of 100 mm×100 mm×3 mm thick was observed to evaluate the appearance thereof before coating. The appearance is good when the evaluation result is rated as "++".

The appearance was evaluated by observing with naked eyes the surface of test piece while particularly paying the attention to the presence or absence of defects such as silver streaks, significant filler floating and flow marks.

The evaluation of the appearance before coating was rated as follows:

--: Defects such as silver streaks, significant filler floating and flow marks are present.

++: No such defects are present.

(8-2) After Coating

At the time when the coating adhesion of above paragraph (7) was evaluated, the appearance of the coating was also evaluated. The appearance is good when the evaluation result is rated as "++".

Thus, a fluorescent lamp was reflected on a surface of the coated test specimen to evaluate the appearance after coating in terms of clarity of the reflection image of the fluorescent lamp with naked eyes as follows:

--: Reflection image is fluctuated, even a little

++: Reflection image is clear.

(9) Retention Stability

A sheet-like test piece with a size of 100 mm×100 mm×3 mm thick which was prepared by the above-described retention molding was evaluated for its retention stability by observation of a surface thereof. The retention stability is good when the evaluation result is rated as "++".

The observation of a surface of the test piece was similar to that of the appearance before coating described in the paragraph (8-1) above. Thus, the retention stability was evaluated by observing with naked eyes the surface of test piece while particularly paying the attention to the presence or absence of defects such as silver streaks, significant filler floating and flow marks.

The evaluation of the retention stability was rated as follows:

--: Defects such as silver streaks, significant filler floating and flow marks are present.

++: No such defects are present.

(10) Method for Evaluating Dispersing Form of Components (A), (B), (C), (D) and (E)

The dispersing form of each component was evaluated by observation by a transmission electron microscope (hereinafter referred to as TEM for brevity) of an ultra-thin section cut, using a diamond knife, from a small piece produced by injection molding of the resin composition. In the TEM observation, the specimen is stained, if necessary, with osmium tetraoxide, ruthenium tetraoxide or the like. The dispersing form was evaluated by identifying each of the components.

The average dispersion particle diameter of each of component (B), component (C) or mixed components (B) and (C) was determined as follows. At least 30 particles of each of the identified components are randomly selected and measured for their sphere equivalent diameters (unit μm) The average particle diameter is an arithmetic mean of the measured diameters.

Examples 1 to 6 and Comparative Examples 1 to 9

Method for Preparing Compositions and Test Pieces Thereof

Compositions were prepared in the following manner in Examples 1 to 6 and Comparative Examples 1 to 9. Thus, each composition was prepared by conducting melting and kneading procedures and dry blending procedures stepwise in plural times so that the contents of components were as shown in Table 1 (Examples 1 to 6) and Table 2 (Comparative Examples 1 to 9).

More specifically, the preparation method included the following steps;

a first pass in which only component (A-1-1) and component (D-1) were melted and kneaded to produce pellets (AD-α);

a succeeding second pass in which component (A) other than component (A-1-1), component (B), component (C), component (F) and pellets (AD-α) obtained in the first pass were melted and kneaded to produce resin composition pellets (ABCDF) comprising components (A), (B), (C), (D) and (F);

a succeeding third pass in which component (E) and pellets (ABCDF) obtained in the second pass were melted and kneaded to produce resin composition pellets (ABCDEF) comprising components (A), (B), (C), (D), (E) and (F); and a final step in which pellets of component (G) were dry-blended with resin composition pellets (ABCDEF) obtained in the third pass to obtain the final composition comprising components (A), (B), (C), (D), (E), (F) and (G). The obtained composition was then molded to carry out various evaluations.

Each of the compositions of Comparative Examples which lacked a certain component was prepared in the same manner as above except that the component was not used. When component (H) was used, it was added at the same timing as component (F) Other component (I) used in some of Comparative Examples was added at the same timing as component (F).

Conditions under which the melting and kneading step was carried out in each stages were as follows.
(1) First Pass A twin screw extruder (TEX-30XCT manufactured by Japan Steel Works, Ltd., screw diameter: 30 mm) was used. Component (A-1-1) was fed from a main feed in the upstream end of the extruder, while component (D-1) was side-fed in a middle portion thereof. These feeds were melted and kneaded in the extruder at a cylinder temperature of 240° C., a screw rotational speed of 200 rpm and a discharge rate of 10 kg/h to produce pellets (AD-α) of melt-kneaded resin composition comprising component (A-1-1) and (D-1) with a content ratio (A-1-1)/(D-1) of 87.5% by weight/12.5% by weight.
(2) Second Pass A twin screw extruder (TEX-30XCT manufactured by Japan Steel Works, Ltd., screw diameter: 30 mm) was used. Predetermined amounts of component (A) other than component (A-1-1), component (B), component (C), component (F) and pellets (AD-α) obtained in the first pass were weighed and mixed with a tumbler mixer. The obtained mixture was fed from a main feed in the upstream end of the extruder, and melted and kneaded therein at a cylinder temperature of 240° C., a screw rotational speed of 400 rpm and a discharge rate of 20 kg/h to produce melt-kneaded resin composition pellets (ABCDF)
(3) Third Pass A twin screw extruder (TEX-30XCT manufactured by Japan Steel Works, Ltd., screw diameter: 30 mm) was used. Predetermined amounts of component (E) and the melt-kneaded resin composition pellets (ABCDF) were weighed and mixed with a tumbler mixer. The obtained mixture was fed from a main feed in the upstream end of the extruder, and melted and kneaded therein at a cylinder temperature of 240° C., a screw rotational speed of 400 rpm and a discharge rate of 20 kg/h to produce melt-kneaded resin composition pellets (ABCDEF).
(4) Predetermined amounts of component (G) and the melt-kneaded resin composition pellets (ABCDEF) were weighed and mixed with a tumbler mixer to obtain a final resin composition.

The final resin composition was vacuum dried at 120° C. for 10 hours to obtain a molding material for use in various tests.

TABLE 1

| Item | Matter | Unit | Desired | Ex. 1 | Ex. 2 | Ex. 3 |
|---|---|---|---|---|---|---|
| Content of Component | A-1-1 | wt. % | | 21 | 21 | 21 |
| | A-2-1 | wt. % | | 34.6 | 34.6 | 30.1 |
| | A-2-2 | wt. % | | | | |
| | B-1 | wt. % | | 14 | 9.5 | 17.6 |
| | C-1 | wt. % | | 5 | 9.5 | 5.9 |
| | D-1 | wt. % | | 3 | 3 | 3 |
| | E-1 | wt. % | | 20 | 20 | 20 |
| | F-1 | wt. % | | 0.4 | 0.4 | 0.4 |
| | G-1 | wt. % | | 2 | 2 | 2 |
| | H-1 | wt. % | | | | |
| Properties of component (A) | ISO viscosity number | ml/g | | 106 | 106 | 105 |
| | Content ratio of terminal carboxyl groups to terminal amino groups | — | | 3.7 | 3.7 | 3.6 |
| Fluidity | Bar-flow flow length | mm | ≧550 | 630 | 580 | 600 |
| Impact resistance | High speed surface impact strength | J | ≧30 | 55 | 60 | 62 |
| Dimensional stability | Reheating shrinkage | % | ≦0.4 | 0.32 | 0.33 | 0.31 |
| | Coefficient of linear thermal expansion | $\times 10^{-5} K^{-1}$ | ≦9 | 8.1 | 8.2 | 8.5 |
| Rigidity | Flexural modulus | MPa | ≧2,500 | 3,200 | 3,100 | 2,800 |

TABLE 1-continued

| Item | Matter | Unit | Desired | | | |
|---|---|---|---|---|---|---|
| Heat-resistant rigidity | Thermal deformation temperature | °C. | ≧180 | 187 | 185 | 182 |
| Electrical conductivity | Volume resistivity | ×10⁸·cm | ≦1 | 0.1 | 0.5 | 0.04 |
| Coating adhesion | Cross-cut adhesion test | — | ++ (good) | ++ | ++ | ++ |
| Appearance | Before coating | — | ++ (good) | ++ | ++ | ++ |
| | After coating | — | ++ (good) | ++ | ++ | ++ |
| Retention stability | Appearance after retention | — | ++ (good) | ++ | ++ | ++ |

| Item | Matter | Unit | Desired | Ex. 4 | Ex. 5 | Ex. 6 |
|---|---|---|---|---|---|---|
| Content of Component | A-1-1 | wt. % | | 21 | 19.9 | 21 |
| | A-2-1 | wt. % | | 25.9 | 33.65 | 34.6 |
| | A-2-2 | wt. % | | 8.7 | | |
| | B-1 | wt. % | | 14 | 13.6 | 14 |
| | C-1 | wt. % | | 5 | 4.5 | 5 |
| | D-1 | wt. % | | 3 | 3 | 3 |
| | E-1 | wt. % | | 20 | 23 | 20 |
| | F-1 | wt. % | | 0.4 | 0.35 | 0.2 |
| | G-1 | wt. % | | 2 | 2 | 2 |
| | H-1 | wt. % | | | | 0.2 |
| Properties of component (A) | ISO viscosity number | ml/g | | 114 | 106 | 106 |
| | Content ratio of terminal carboxyl groups to terminal amino groups | — | | 3.2 | 3.7 | 3.7 |
| Fluidity | Bar-flow flow length | mm | ≧550 | 570 | 600 | 640 |
| Impact resistance | High speed surface impact strength | J | ≧30 | 65 | 43 | 50 |
| Dimensional stability | Reheating shrinkage | % | ≦0.4 | 0.27 | 0.24 | 0.21 |
| | Coefficient of linear thermal expansion | ×10⁻⁵K⁻¹ | ≦9 | 8 | 7.3 | 7.2 |
| Rigidity | Flexural modulus | MPa | ≧2,500 | 3,300 | 3,500 | 3,600 |
| Heat-resistant rigidity | Thermal deformation temperature | °C. | ≧180 | 189 | 192 | 192 |
| Electrical conductivity | Volume resistivity | ×10⁸·cm | ≦1 | 0.4 | 0.3 | 0.2 |
| Coating adhesion | Cross-cut adhesion test | — | ++ (good) | ++ | ++ | ++ |
| Appearance | Before coating | — | ++ (good) | ++ | ++ | ++ |
| | After coating | — | ++ (good) | ++ | ++ | ++ |
| Retention stability | Appearance after retention | — | ++ (good) | ++ | ++ | ++ |

TABLE 2

| Item | Matter | Unit | Desired | Comp. Ex. 1 | Comp. Ex. 2 | Comp. Ex. 3 |
|---|---|---|---|---|---|---|
| Content of Component | A-1-1 | wt. % | | 21 | 21 | 21 |
| | A-1-2 | wt. % | | | | |
| | A-1-3 | wt. % | | | | |
| | A-2-1 | wt. % | | 34.6 | 34.6 | 35 |
| | B-1 | wt. % | | | 19 | 14 |
| | C-1 | wt. % | | 19 | | 5 |
| | I-1 | wt. % | | | | |
| | D-1 | wt. % | | 3 | 3 | 3 |
| | E-1 | wt. % | | 20 | 20 | 20 |
| | F-1 | wt. % | | 0.4 | 0.4 | |

TABLE 2-continued

| Item | Matter | Unit | Desired | | | |
|---|---|---|---|---|---|---|
| | G-1 | wt. % | | 2 | 2 | 2 |
| | H-1 | wt. % | | | | |
| Properties of component (A) | ISO viscosity number | ml/g | | 106 | 106 | 106 |
| | Content ratio of terminal carboxyl groups to terminal amino groups | — | | 3.7 | 3.7 | 3.7 |
| Fluidity | Bar-flow flow length | mm | ≧550 | 520 | 750 | 620 |
| Impact resistance | High speed surface impact strength | J | ≧30 | 55 | 5 | 50 |
| Dimensional stability | Reheating shrinkage | % | ≦0.4 | 0.4 | 0.21 | 0.33 |
| | Coefficient of linear thermal expansion | ×10⁻⁵K⁻¹ | ≦9 | 8.5 | 7.1 | 8.2 |
| Rigidity | Flexural modulus | MPa | ≧2,500 | 2,900 | 3,800 | 2,900 |
| Heat-resistant rigidity | Thermal deformation temperature | °C. | ≧180 | 182 | 193 | 181 |
| Electrical conductivity | Volume resistivity | ×10⁸Ω·cm | ≦1 | 0.7 | 0.06 | 0.1 |
| Coating adhesion | Cross-cut adhesion test | — | | ++ (good) | ++ | -- | ++ |
| Appearance | Before coating | — | | ++ (good) | -- | -- | ++ |
| | After coating | — | | ++ (good) | ++ | -- | ++ |
| Retention stability | Appearance after retention | — | | ++ (good) | -- | -- | -- |

| Item | Matter | Unit | Desired | Comp. Ex. 4 | Comp. Ex. 5 | Comp. Ex. 6 |
|---|---|---|---|---|---|---|
| Content of Component | A-1-1 | wt. % | | 21 | | 21 |
| | A-1-2 | wt. % | | | | 34.6 |
| | A-1-3 | wt. % | | | 37 | |
| | A-2-1 | wt. % | | 36.6 | 21.6 | |
| | B-1 | wt. % | | 14 | 14 | 14 |
| | C-1 | wt. % | | 5 | 5 | 5 |
| | I-1 | wt. % | | | | |
| | D-1 | wt. % | | 3 | | 3 |
| | E-1 | wt. % | | 20 | 20 | 20 |
| | F-1 | wt. % | | 0.4 | 0.4 | 0.4 |
| | G-1 | wt. % | | | 2 | 2 |
| | H-1 | wt. % | | | | |
| Properties of component (A) | ISO viscosity number | ml/g | | 107 | 106 | 94.5 |
| | Content ratio of terminal carboxyl groups to terminal amino groups | — | | 3.6 | 3.2 | 1.6 |
| Fluidity | Bar-flow flow length | mm | ≧550 | 620 | 680 | 500 |
| Impact resistance | High speed surface impact strength | J | ≧30 | 55 | 64 | 61 |
| Dimensional stability | Reheating shrinkage | % | ≦0.4 | 0.33 | 0.34 | 0.26 |
| | Coefficient of linear thermal expansion | ×10⁻⁵K⁻¹ | ≦9 | 8.1 | 8.2 | 7.8 |
| Rigidity | Flexural modulus | MPa | ≧2,500 | 3,100 | 3,000 | 3,300 |
| Heat-resistant rigidity | Thermal deformation temperature | °C. | ≧180 | 185 | 182 | 185 |
| Electrical conductivity | Volume resistivity | ×10⁸Ω·cm | ≦1 | 0.1 | >2 | 0.09 |
| Coating adhesion | Cross-cut adhesion test | — | | ++ (good) | -- | ++ | ++ |

TABLE 2-continued

| Item | Matter | Unit | Desired | | | | |
|---|---|---|---|---|---|---|---|
| Appearance | Before coating | — | | ++ (good) | ++ | ++ | ++ |
| | After coating | — | | ++ (good) | ++ | ++ | ++ |
| Retention stability | Appearance after retention | — | | ++ (good) | ++ | ++ | ++ |

| Item | Matter | Unit | Desired | Comp. Ex. 7 | Comp. Ex. 8 | Comp. Ex. 9 |
|---|---|---|---|---|---|---|
| Content of Component | A-1-1 | wt. % | | 21 | 21 | 26.25 |
| | A-1-2 | wt. % | | | | |
| | A-1-3 | wt. % | | | | |
| | A-2-1 | wt. % | | 34.6 | 34.4 | 43.4 |
| | B-1 | wt. % | | | 14 | 18 |
| | C-1 | wt. % | | | 5 | 6 |
| | I-1 | wt. % | | 19 | | |
| | D-1 | wt. % | | 3 | 3 | 3.75 |
| | E-1 | wt. % | | 20 | 20 | |
| | F-1 | wt. % | | 0.4 | | 0.5 |
| | G-1 | wt. % | | 2 | 2 | 2 |
| | H-1 | wt. % | | | 0.6 | |
| Properties of component (A) | ISO viscosity number | ml/g | | 106 | 106 | 106 |
| | Content ratio of terminal carboxyl groups to terminal amino groups | — | | 3.7 | 3.7 | 3.7 |
| Fluidity | Bar-flow flow length | mm | $\geq 550$ | 480 | 650 | 780 |
| Impact resistance | High speed surface impact strength | J | $\geq 30$ | 44 | 40 | 65 |
| Dimensional stability | Reheating shrinkage | % | $\leq 0.4$ | 0.4 | 0.2 | 0.52 |
| | Coefficient of linear thermal expansion | $\times 10^{-5} K^{-1}$ | $\leq 9$ | 8.9 | 7 | 10.8 |
| Rigidity | Flexural modulus | MPa | $\geq 2,500$ | 3,100 | 3,700 | 1,800 |
| Heat-resistant rigidity | Thermal deformation temperature | °C. | $\geq 180$ | 182 | 192 | not measured |
| Electrical conductivity | Volume resistivity | $\times 10^8 \Omega \cdot cm$ | $\leq 1$ | 0.3 | 0.1 | 0.07 |
| Coating adhesion | Cross-cut adhesion test | — | | ++ (good) | ++ | ++ | ++ |
| Appearance | Before coating | — | | ++ (good) | ++ | ++ | ++ |
| | After coating | — | | ++ (good) | ++ | ++ | ++ |
| Retention stability | Appearance after retention | — | | ++ (good) | ++ | −− | ++ |

As seen from Table 1, the polyamide resin compositions of Examples 1 to 6 (Ex. 1 to Ex. 6) according to the present invention show highly balanced physical properties and retention stability. In particular, each of the resin compositions satisfies all of the desired values of property items which are required as thermoplastic resin compositions for producing automobile exterior parts. Although not shown in Table 1, the polyamide resin compositions of Examples 1 to 6 were found to have the following dispersing forms of components (A) to (E).

(i) component (A) forms a sea phase;
(ii) a mixture of components (B) and (C) forms island phases with an average particle diameter of about 0.3 μm dispersed in the phase of component (A);
(iii) substantially entire amount of component (D) is dispersed in the phase of component (A) and component (D) does not exist in the islands phases of component (B) and the like; and
(iv) substantially entire amount of component (E) is dispersed in the phase of component (A) and component (E) does not exist in the islands phases of component (B) and the like.

On the other hand, as seen from Table 2, Comparative Examples 1 to 9 (Comp. Ex. 1 to Comp. Ex. 9) fail to satisfy at least one of the desired values and are ill-suited as thermoplastic resin compositions for producing automobile exterior parts. In particular, Comparative Example 1 is unsatisfactory with respect to fluidity, appearance before coating and retention stability, Comparative Example 2 is unsatisfactory with respect to coating adhesion, appearance before coating, appearance after coating and retention stability, Comparative Example 3 is unsatisfactory with respect to retention stability, Comparative Example 4 is unsatisfactory with respect to coating adhesion, Comparative Example 5 is unsatisfactory with respect to electrical conductivity, Comparative Example 6 is unsatisfactory with respect to fluidity, Comparative Example 7 is unsatisfactory with respect to fluidity, Comparative Example 8 is unsatisfactory with respect to retention stability, and Comparative Example 9 is unsatisfactory with respect to dimensional stability and rigidity.

INDUSTRIAL APPLICABILITY

The thermoplastic resin composition for producing automobile exterior parts according to the present invention has highly balanced physical properties required as a resin material for producing automobile exterior parts. Similarly to a steel plate, the obtained automobile exterior parts permit electrostatic coating without a need for a primer treatment. The thermoplastic resin composition can produce automobile exterior parts having excellent properties.

Examples of the automobile exterior part include backdoors, bumper fascias, front fenders, rear fenders, fuel lids, door panels, tail gates panels, front panels, bonnets, roof panels, license garnishes, trunk lids, rocker moldings, rear garnishes and door garnishes.

What is claimed is:

1. A thermoplastic resin composition for producing automobile exterior parts, comprising the following components (A) to (H) in the following weight percentage ranges based on 100% by weight of the sum of the entire components constituting said composition:
   18 to 80% by weight of component (A) which is a polyamide 6 resin having a viscosity number, as measured in accordance with ISO-307, of 80 to 120 ml/g and a ratio of a content of terminal carboxyl groups (unit: µeq/g) to a content of terminal amino groups (unit: µeq/g) of $2 \leq$ (terminal carboxyl group content/terminal amino group content) $\leq 6$;
   5 to 25% by weight of component (B) which is a hydrogenated product of a block copolymer comprising a vinyl aromatic compound polymer block and a conjugated diene compound polymer block;
   3 to 15% by weight of component (C) which is a graft-modified hydrogenated product of a block copolymer comprising a vinyl aromatic compound polymer block and a conjugated diene compound polymer block, said hydrogenated product being graft-modified with maleic anhydride in an amount of 2.6 to 5.0% by weight based on 100% by weight of said graft-modified hydrogenated product;
   1 to 5% by weight of component (D) which is conductive carbon black having a BET specific surface area of not less than 600 $m^2$/g and a DBP oil absorption of not less than 300 ml/100 g;
   10 to 30% by weight of component (E) which is talc having an average particle diameter of 0.5 to 10 µm;
   0.1 to 2% by weight component (F) which is a phosphonite compound;
   0.5 to 5% by weight of component (G) which is an ethylene-vinyl alcohol resin; and
   0 to 1% by weight of component (H) which is a pentaerythritol based phosphite.

2. A thermoplastic resin composition for producing automobile exterior parts as defined in claim 1, wherein component (H), the pentaerythritol based phosphite, is present in an amount of 0.1 to 1% by weight based on 100% by weight of the sum of the entire components constituting said composition.

3. A thermoplastic resin composition for producing automobile exterior parts as defined in claim 1, wherein component (A) is a mixture comprising component (A-1) which is a polyamide 6 resin having an ISO viscosity number of less than 100 ml/g and component (A-2) which is a polyamide 6 resin having an ISO viscosity number of not less than 100 ml/g.

4. A thermoplastic resin composition for producing automobile exterior parts as defined in claim 1, obtained by dry blending pellets of a resin composition, obtained by fusing and kneading all of the components except component (G), with pellets of component (G).

5. A thermoplastic resin composition for producing automobile exterior parts as defined in claim 1, wherein the hydrogenated products of a block copolymer constituting component (B) and component (C) are a styrene-ethylene-butene-styrene block copolymer and a graft-modified product of a styrene-ethylene-butene-styrene block copolymer, respectively.

6. A thermoplastic resin composition for producing automobile exterior parts as defined in claim 5, wherein the styrene-ethylene-butene-styrene block copolymer has a styrene content of 15 to 25% by weight based on 100% by weight of component (B) or component (C).

7. A thermoplastic resin composition for producing automobile exterior parts as defined in claim 1, wherein each of component (D) and component (E) is dispersed mainly in a sea phase of component (A).

8. A thermoplastic resin composition for producing automobile exterior parts as defined in claim 1, wherein content ratios of components (A) to (D) satisfy the following equations (1) and (2):

$$\text{component } (A)/(\text{component } (B)+\text{component } (C))=65/35 \text{ to } 85/15 \qquad \text{Equation (1):}$$

(wherein component (A), component (B) and component (C) represent weight percentages thereof based on 100% by weight of the sum of components (A), (B) and (C))

$$\text{component } (A)/\text{component } (D)=93/7 \text{ to } 97/3 \qquad \text{Equation (2):}$$

(wherein component (A) and component (D) represent weight percentages thereof based on 100% by weight of the sum of components (A) and (D)).

9. An automobile exterior part obtained by injection molding the thermoplastic resin composition for producing automobile exterior parts as defined in claim 1, and applying an electrostatic coating over the obtained injection-molded product.

* * * * *